US005635016A

United States Patent [19]
Byerley

[11] Patent Number: 5,635,016
[45] Date of Patent: Jun. 3, 1997

[54] TRANSFER RING OR DRUM APPARATUS WITH ADJUSTABLE CIRCUMFERENCE

[75] Inventor: Mark S. Byerley, Greenback, Tenn.

[73] Assignee: Wyko, Inc., Greenback, Tenn.

[21] Appl. No.: 547,381

[22] Filed: Oct. 24, 1995

[51] Int. Cl.$^6$ .................................................. B29D 30/26
[52] U.S. Cl. ........................ 156/406.2; 156/417; 156/420
[58] Field of Search .................................... 156/417, 414, 156/418, 419, 420, 406.2

[56] References Cited

U.S. PATENT DOCUMENTS

| | | | |
|---|---|---|---|
| 3,607,558 | 9/1971 | Nebout | 156/417 |
| 3,833,444 | 9/1974 | Mallory | 156/417 |
| 4,547,251 | 10/1985 | Landsness | 156/415 |
| 4,923,554 | 5/1990 | Ozawa | 156/417 |
| 5,203,947 | 4/1993 | Boeker | 156/417 |

FOREIGN PATENT DOCUMENTS

1696315 12/1991 U.S.S.R. ................................ 156/414

*Primary Examiner*—Geoffrey L. Knable
*Attorney, Agent, or Firm*—Paul E. Hodges, P.C.

[57] ABSTRACT

Apparatus defining an outer circumference suitable to serve as a forming surface or an inner circumference suitable to serve as a circumference-engaging surface. The apparatus is particularly useful in the forming of the belt and tread package of a vehicle tire or as a transfer ring for grasping a belt and tread package of a vehicle tire. The apparatus includes a plurality of multi-sectioned segments of arcuate cross-section which collectively define the cylindrical surface of the apparatus and which are supported for movement radially of the longitudinal axis of the apparatus for adjustment of the circumference of the cylindrical surface. Each segment includes an intermediate section and two side sections hingedly connected to the intermediate section. The segments also include guide plates which cooperate with a side section of an adjacent segment so that movement of each segment radially of the drum effects a corresponding hinged movement of a side section of an adjacent arcuate segment.

12 Claims, 11 Drawing Sheets

PRIOR ART

TRANSFER RING OR DRUM APPARATUS WITH ADJUSTABLE CIRCUMFERENCE

FIELD OF THE INVENTION

This invention relates to devices that are particularly useful in the making of vehicle tires and relates, more particularly, to apparatus defining an outer circumference suitable to serve as a forming surface or to grasp the inner circumference of a tubular or like object, or an as an inner circumference to serve to grasp the outer circumference of a circular, tubular or round object. More specifically, this invention relates to an improved belt and tread drum or an improved transfer ring, useful in the manufacture of vehicle tires.

BACKGROUND OF THE INVENTION

The manufacture of a vehicle tire commonly includes the steps of forming a tire carcass, forming a belt and tread portion of the tire separately of the carcass, and thereafter marrying the belt and tread portion of the tire to the carcass to form a "green" tire. The green tire is thereafter treated to form the tread and various other features of the tire. Other supplementary steps, such as stitching, may be performed during the course of or following one or more of the aforementioned steps.

Formation of the belt and tread portion of the tire is accomplished on a belt and tread drum. Such a drum has an outer cylindrical surface, or circumference, about which one or more layers of tire belt material (comprising, for example, reinforcement cords embedded in a polymeric binder) are laid, and subsequent to the laying down of the tire belt material, the belt material is overlaid with one or more layers of strip tread material to comprise a "package".

The belt and tread drum is rotatably mounted about a central longitudinal axis, and the several layers that make up the belt and tread package are laid onto the drum as it is rotated. The circumference of such a drum is preferably capable of expanding and contracting to, for example, accommodate the removal of a completed package (which is essentially nonexpandable radially) from the drum circumference and to enable a single drum to be used to form belt and tread packages of alternative diameters. The circumference of such a drum can be collectively comprised of a plurality of rigid arcuate segments wherein each segment provides an arc of the cylindrical surface and is mounted for movement toward and away from the longitudinal axis of the drum to accommodate the adjustment in drum circumference. Furthermore, each segment is preferably provided with a plurality of fingers which cooperate, or mate with, the fingers provided in an adjacent segment so that as the circumference of the drum is expanded and contracted, the cooperating fingers render the perimeter of the cylindrical surface usefully continuous.

In the manufacture of a vehicle tire, a carcass is formed on a drum in a manner somewhat similar to the forming of a belt and tread package so that the drum used in forming a tire carcass may employ the concepts of the present invention. Further, after the carcass has been formed, it is transferred to a second stage drum and held thereon while a belt and tread package is transferred from the belt and tread drum onto the outer circumference of the carcass employing a transfer ring. Thereafter the belt and tread package is married to the carcass. The transfer ring commonly employed comprises basically an inverted belt and tread drum. That is, whereas the outer circumference of the belt and tread drum is adjustable to accommodate the formation of the belt and tread package thereon and to permit the removal therefrom of a completed belt and tread package, the inner circumference of the transfer ring is adjustable to permit the ring to encompass the outer circumference of the belt and tread package and contract in diameter to cause the segments of the transfer ring to engage and grasp the belt and tread package for transferring of the package to the carcass of the tire.

It follows, however, that the radius of curvature of the arc of the drum's outer cylindrical surface or the transfer ring's inner circumference provided by their respective accurate segments are each fixed by the rigidity of the segments, thus rendering it impossible for the segments to be moved between two radial positions and collectively provide perfectly-formed cylindrical surfaces at each of the two positions. If, for example, the circumference of the drum is adjusted to a size at which the segments are positioned at a distance from the longitudinal axis which exceeds the radius of curvature of each segment arc, there will exist, transitional regions, or "spots", about the drum circumference where the surface is relatively flat, thus rendering the drum out-of-round. If these flat transitional regions are large enough (as is likely in the case when the drum is expanded to accommodate a tire of relatively large diameter), the drum is likely to produce undesirable "flat-spotting" effects on a tire constructed with the drum, wherein these flat spotting effects are a consequence of the severity of radial runout during the construction of a tire component upon the drum. Such flat-spotting effects are undesirable in that they are known to adversely affect tire performance. The size, and thus the effects, of these flat spots can be reduced by increasing the number of segments about the drum circumference to thereby provide a greater number of segments through a given arc of the cylindrical surface. However, the mechanical structure mounted internal of the drum needed to support the segments for movement radially of the drum prevents the increase in the number of segments beyond a practical limit. Flat-spotting is also a problem associated with prior art transfer rings in that the newly-formed belt and tread package is sensitive to deformation by contact with the segments of the transfer ring and the flat spots are "imprinted" into the outer circumference of the belt and tread package. These imprints later show up as irregularities in a finished tire.

It is therefore an object of the present invention to provide a new and improved belt and tread drum of the afore-described class wherein flat-spotting effects produced with the drum are substantially reduced.

Another object of the present invention is to provide such a drum wherein the severity of the out-of-round condition of the drum when its circumferential surface is expanded to relatively large diameters is appreciably lessened.

Another object of the present invention is to provide such a belt and tread drum having circumference-providing segments which are uncomplicated in construction and effective in operation.

It is another object of the present invention to provide an improved device for grasping the outer diameter of a tire component or carcass and having reduced flat-spotting tendencies.

It is another object to provide a multi-segmented expandable/collapsible apparatus for grasping the inner diameter or the outer diameter of circular or ring-type objects which are sensitive to alteration of their diameter by reason of flat-spotting of their diameter when grasped.

It is another object of the present invention to provide a multi-segmented transfer ring for use in the manufacture of vehicle tires.

SUMMARY OF THE INVENTION

In its more broad aspects, the present invention provides a frame which serves to mount a plurality of multi-sectional segments that collectively define the circumference of an apparatus having a central axis and for use as a forming surface (as in the build up of a belt and tread package for a vehicle tire), or for use, in grasping the inner circumference or the outer circumference of a circular, tubular or round object (as in a transfer ring) and in which the multi-sectional segments are each arcuate in cross section to cooperatively define a circumference. Each multi-sectional segment includes an intermediate section that is mounted for radial movement inwardly and outwardly, relative to the central axis of the apparatus, and flanking side sections that are hingedly mounted to the intermediate section on the opposite sides thereof for relative hinged movement with respect to the intermediate section such that their composite cross sections closely approximate a true circumference over the entire range of radial movement of the intermediate section, thereby materially reducing the commonly experienced flat spots between adjacent segments.

Figure 2:
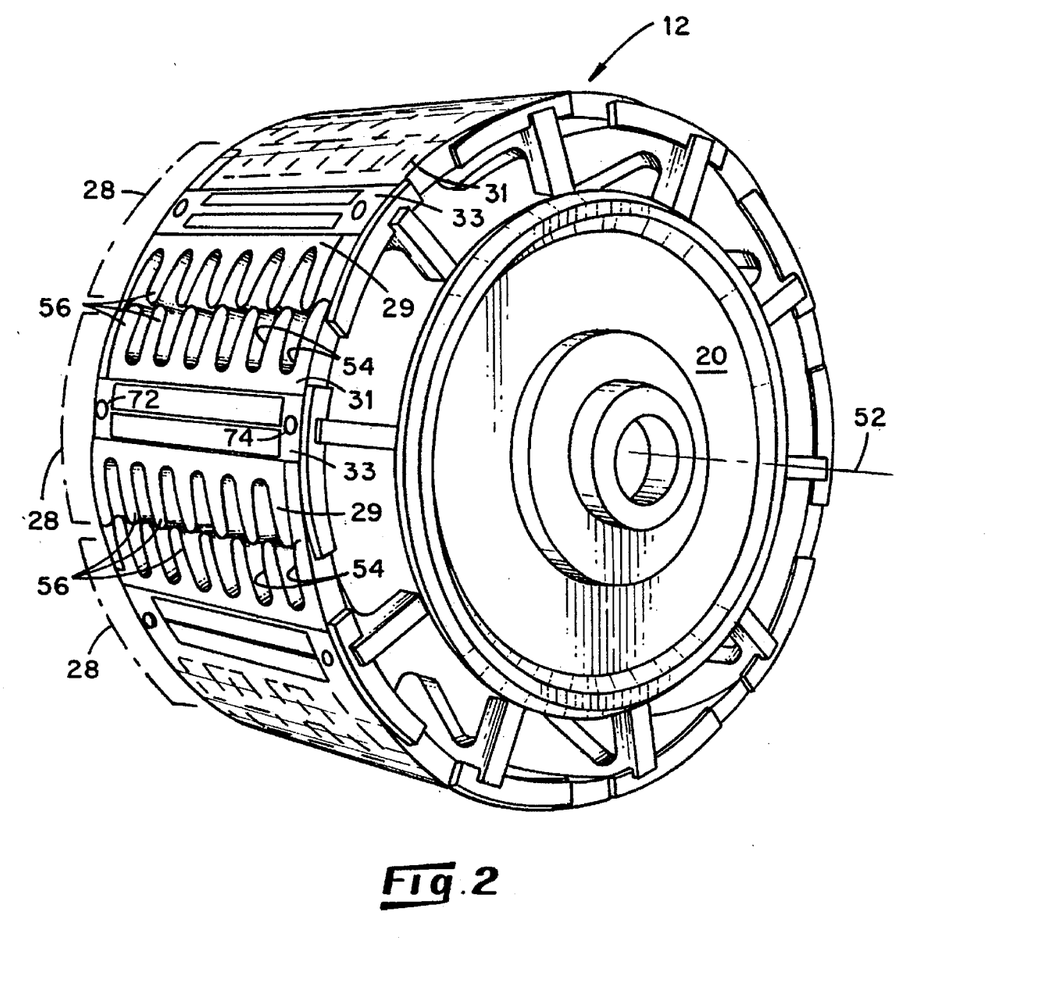
FIG. 2 is a perspective view of the belt and tread drum of the FIG. 1 machine.

As noted, in accordance with one aspect of the present invention, there are provided three sections per segment, an intermediate section and two flanking side sections. The flanking side sections are aligned parallel and in side-by-side relationship with the intermediate section, the latter being mounted to means for moving this intermediate section inwardly and outwardly of the apparatus as the circumference defined by the several segments is expanded or contracted. The intermediate section is flanked on its opposite sides by the two side sections of the segment which are circumferentially adjacent the intermediate section as depicted in FIGS. 2 and 26, for example. Pin means are provided at opposite ends of each of the two flanking side sections for hingedly connecting each of the flanking side sections to a respective side edge of the intermediate section thereby rendering the flanking side sections fixed to the intermediate section as respects their ability to move radially inwardly or outwardly with the intermediate section, but also permitting the hinged movement of the flanking side sections about these pin means in response to the guiding thereof by the guide means as further described hereinbelow.

Means are provided for interconnecting the side sections of a first segment with the respective side sections of those segments immediately adjacent the opposite sides of the first segment such that radial movement of the intermediate sections of adjacent segments results in guided hinged movement of the several respective side sections, relative to their respective intermediate sections, thereby reducing the extent of nonuniformity of the circumference defined by the apparatus. In one embodiment, this interconnection includes a guide member fixedly mounted on an end of the intermediate section and extending laterally therefrom adjacent to an end portion of a side section of an adjacent multi-sectional segment. This guide is provided with means for slidably receiving a fixed pin or like member that is fixedly mounted on the side section of the adjacent segment, such means being designed to guide the pin, hence its accompanying section in a hinged movement relative to the intermediate section to which the guide is attached as this intermediate section is moved radially inwardly or outwardly. A like interconnecting arrangement is provided on the opposite end of the intermediate section, but with the guide means extending from the first intermediate section to engage a pin means on the end of the adjacent side section of the segment that is adjacent the opposite side of the first segment. In this manner, all adjacent segments are interconnected at their respective side sections such that as the intermediate sections of the segments are moved radially inwardly and outwardly, all side sections of all segments are guided in like hinged movement about the pivot axis of their respective hinge mountings.

In one embodiment, the present apparatus includes an improvement in a drum apparatus for use in the forming of the belt and tread package of a vehicle tire wherein the drum apparatus has a longitudinal axis and a plurality of arcuate segments which each define an arc of the outer cylindrical surface of the drum apparatus so that the segments collectively define the outer cylindrical surface. In addition, the arcuate segments are supported for rotational movement radially of the longitudinal axis to accommodate an adjustment in the circumference of the cylindrical surface.

In accordance with another aspect of the present invention, each intermediate section takes the form of a central hinge-mounting arrangement that is itself mounted to that part of the apparatus which serves to adjust the inner and outer circumference defined by the plurality of segments. In this embodiment, two flanking segments are associated with each central hinge mounting. This hinge mounting, in the embodiment depicted in FIGS. 17 and 18 takes the forms of two hinge pins that are mounted adjacent the opposite ends of the segment and in longitudinal alignment with one another. These hinge pins serve the purpose of the intermediate section of a three-section segment. Each section of the segment defines an arcuate portion of the desired cylindrical surface and the sections are hingedly rotatably movable relative to one another about the common longitudinal axis of the hinge pin, this axis being oriented substantially parallel to the longitudinal axis of the drum apparatus, for example.

By rendering each segment multi-sectional wherein its sections are guided in hinged movement relative to one another during an adjustment of the drum circumference, the size of the flat spots evident along the drum circumference at various positions of expansion are substantially reduced.

BRIEF DESCRIPTION OF THE DRAWINGS

The above and further features of a preferred embodiment of the present invention may be best understood with reference to the following detailed description of a preferred embodiment and the drawings in which.

DETAILED DESCRIPTION OF A PREFERRED EMBODIMENT

Figure 1:
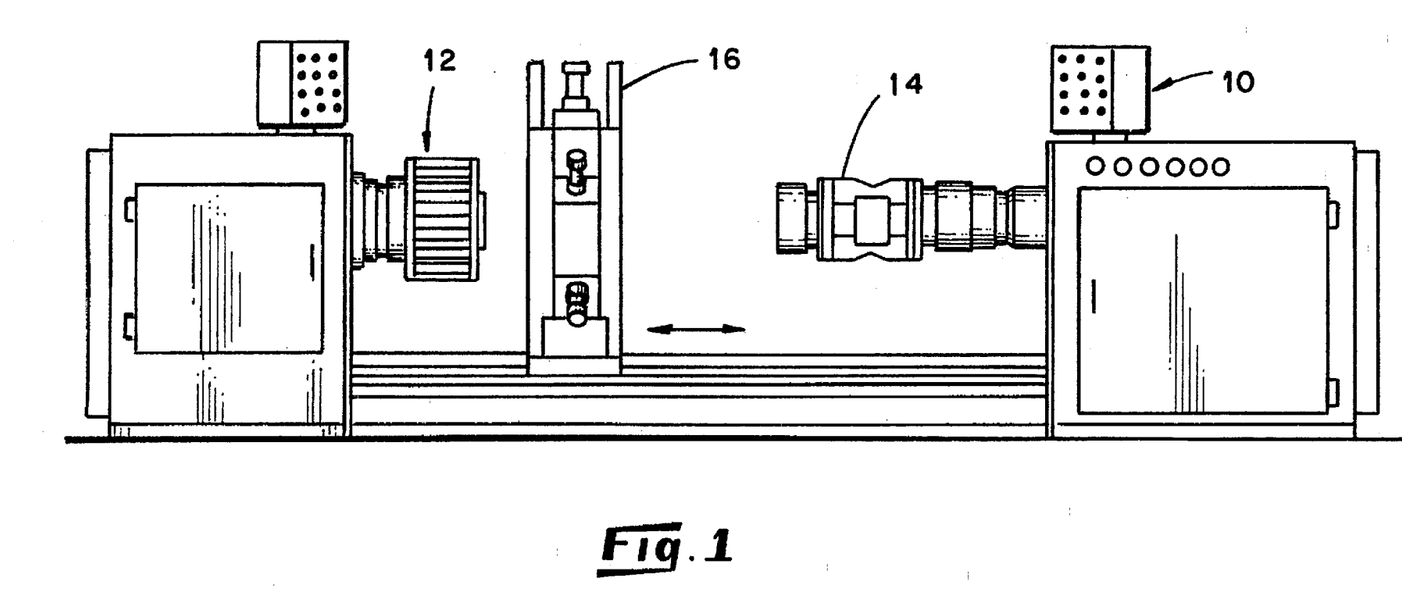
FIG. 1 is a side view of a tire making machine within which a belt and tread drum in accordance with the present invention is incorporated.

Referring now to the Figures in which like reference numerals indicate like or corresponding features, there is shown in FIG. 1 a tire building machine 10 including a belt and tread drum 12 within which features of the present invention are embodied, an expander drum 14, and a transfer ring 16. Briefly, the making of a vehicle tire is effected in multiple stages. In a first stage, the carcass of the tire is formed. This carcass comprises a sheet of polymeric material having embedded reinforcement cords and formed around two bead wires to form the flexible inner carcass of the tire. A second stage of the tire-building process involves the forming of a belt and tread package on the belt and tread drum 12.

The carcass formed in the first stage is transferred to an expander drum 14 which contacts the beads of the carcass to form an airtight seal and inflates the carcass so that the outer diameter thereof is slightly less than the inner diameter of the belt and tread package of the tire. Once the first stage carcass is placed upon the expander drum 14, a transfer ring 16 is placed around the belt and tread package, and the belt and tread drum is collapsed so that the package is supported by the transfer ring 16. The transfer ring 16 then transfers the belt and tread package to the expander drum 14 and positions the package around the outside of the partially inflated carcass which is already in position on the expander 14. The carcass is then further inflated to contact the inside of the belt and tread package, and the belt and tread package is subsequently married to the carcass.

As far as the construction of the belt and tread drum 12 is concerned, the circumference of the drum 12 is capable of expanding to various diameters to accommodate the build up of belt and tread packages for tires of different diameters. Therefore, when tires of various sizes need to be made on a given, or single, drum, the diameter of the circumference of the belt and tread drum must be adjusted accordingly. Additionally, the belt and tread drum must be able to be collapsed from an expanded condition to permit the belt and tread package to be removed for transfer to a subsequent stage of the tire making process.

Figure 3:
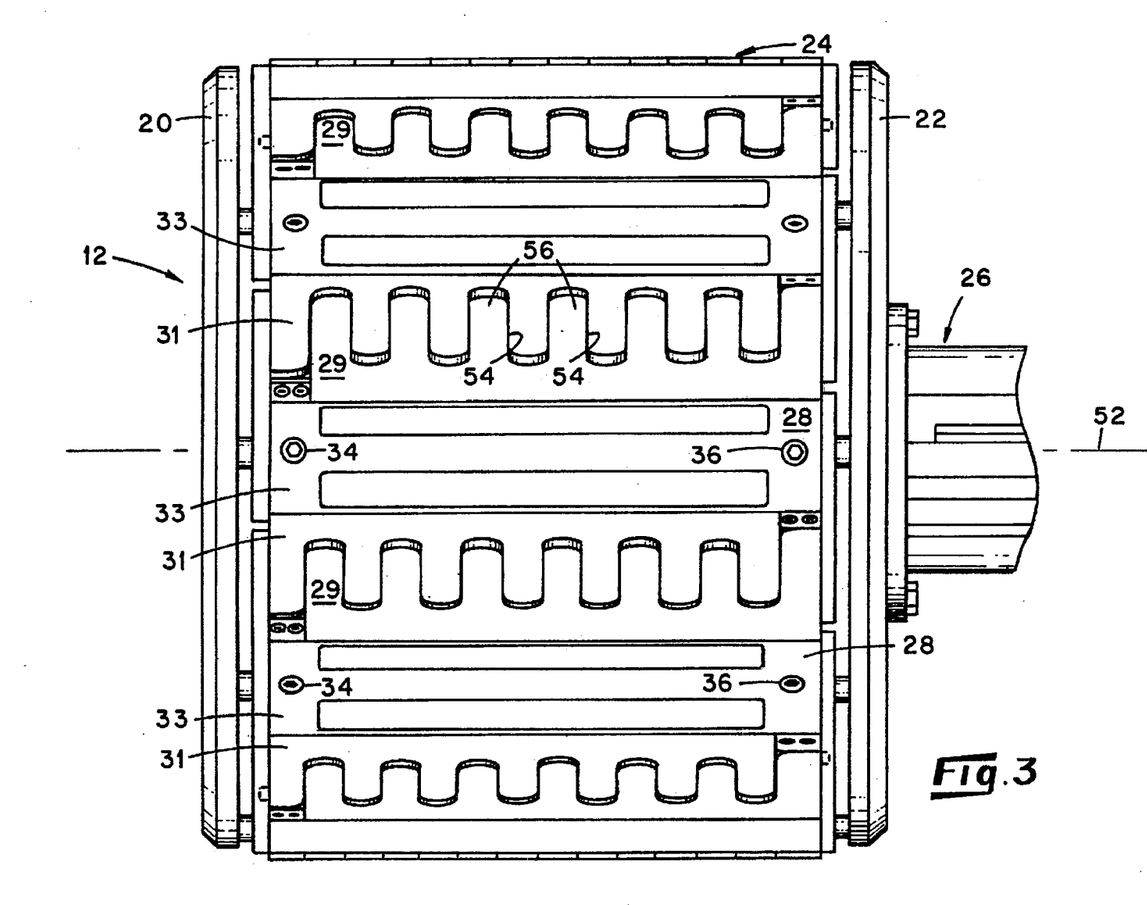
FIG. 3 is a side view of the belt and tread drum of FIG. 2 depicting the circumference of the drum in its condition of minimum circumference.
Figure 4:
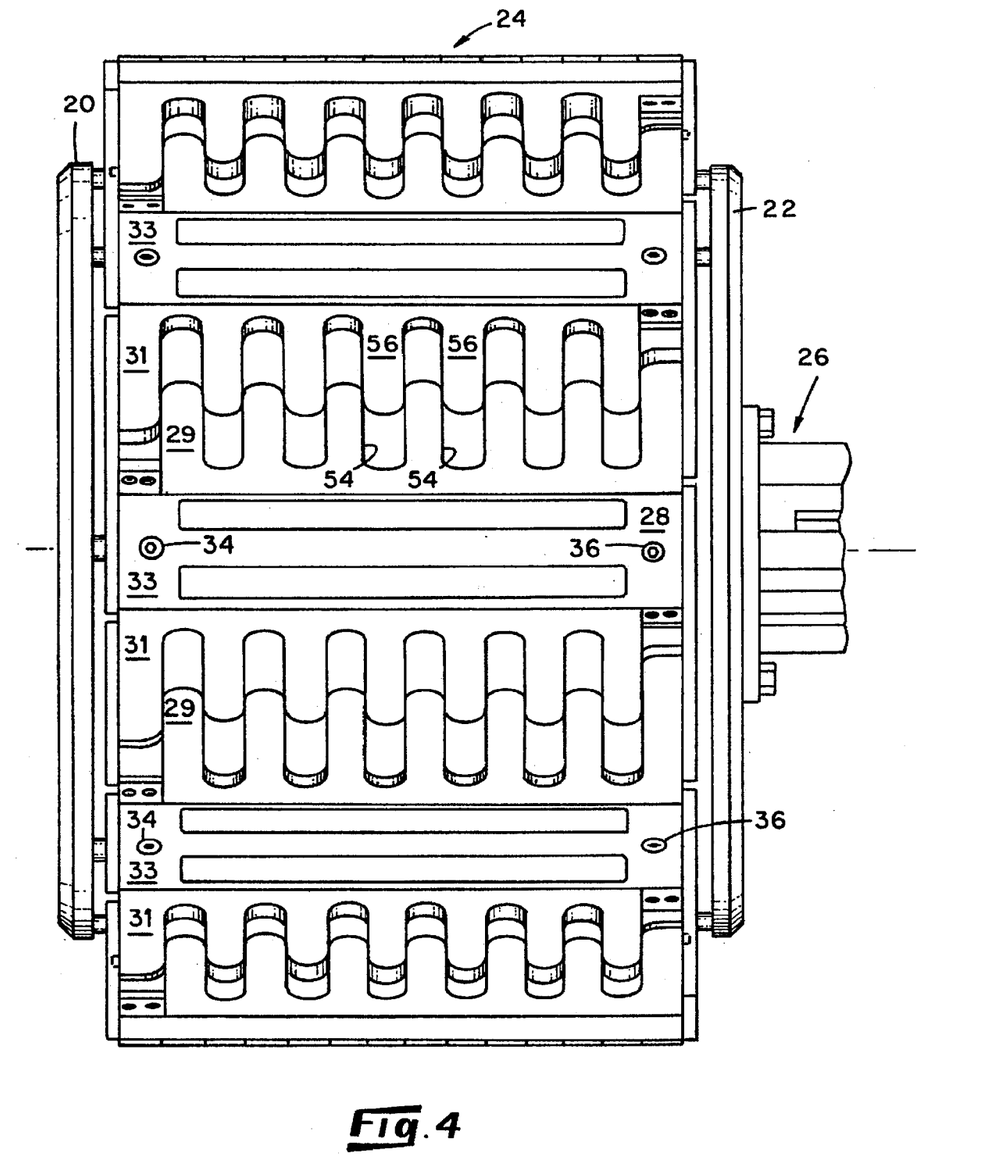
FIG. 4 is a view similar to that of FIG. 3 depicting the circumference of the drum in its condition of maximum circumference.

With reference to FIGS. 2–4, there is depicted an embodiment of a belt and tread drum 12 in accordance with the present invention, wherein the bead and tread drum 12 is generally of cylindrical geometry. The depicted drum 12 includes first and second flat disc-shaped end plates 20 and 22, respectively, and a central body portion, indicated generally by the numeral 24 and which is disposed between the end plates 20 and 22. This body portion 24 is made up of a plurality of relatively movable components, the sum of whose movements results in controlled and measured change in the outer circumference of the body portion 24 to accommodate the manufacture of tires of various sizes (i.e. tires of different diameters). Selection and control over the maximum circumference of the drum is provided for externally of the drum by means of an adjustment mechanism 26.

More specifically, the body portion 24 of the depicted belt and tread drum 12 includes a plurality of circumference-defining, multi-sectioned segments 28 whose outer arcuate surfaces collectively define an arc or segment of the outer circumference of the drum 12. Each segment 28 is joined, as with bolts 34 and 36, to a planar cam element 38 (FIG. 5) having two opposite side ends 40 and 42 which are slidably received in radially-extending slots provided in the inner surfaces 48 and 50 of the opposite end plates 20 and 22. With the cam element 38 mounted in this manner, it is radially movable with respect to the longitudinal centerline 52 of the drum 12.

Figure 6:
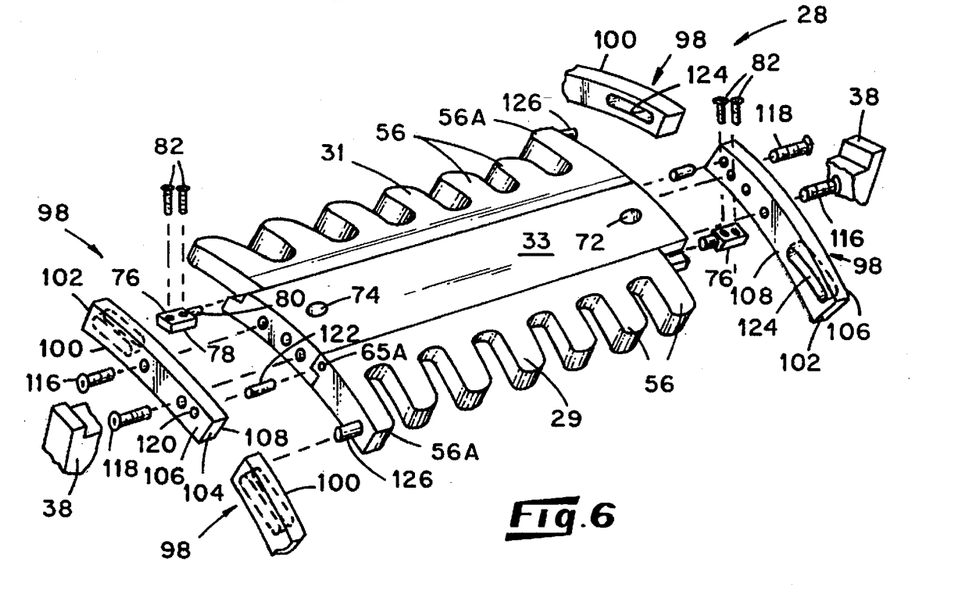
FIG. 6 is a perspective view of a multi-sectioned arcuate segment of the FIG. 2 drum, shown exploded.

As depicted in FIGS. 2–4, there is provided a plurality of the aforementioned circumference-defining, multi-sectioned segments 28 disposed about the circumference of the drum 12, the cumulative effect of which is to define the overall outer circumference of the drum. As best shown in FIGS. 3, 4 and 6, each segment 28 of the depicted drum 12 includes a first side section 29, a second side section 31 and an intermediate section 33 disposed between the side sections 29 and 31. Each side section 29 or 31 of each segment 28 is provided with a plurality of slots 54 along one of its longitudinal side margins. Defined between these slots 54 are alternating fingers 56 that are designed to be received within the slots 54 of the side section 29 or 31 of an adjacent segment 28. In FIGS. 2 and 3, the several segments 28 are depicted with the fingers 56 of the side sections thereof being fully received within respective mating slots of adjacent segments 28. In this position of the segments 28, the circumference of the drum 12 is at its minimum value. In FIG. 4, the drum 12 is depicted at its maximum expanded circumference with the fingers 56 of the several segments 28 being withdrawn (partially) from the slots 54 of respective adjacent segments 28.

Figure 5:
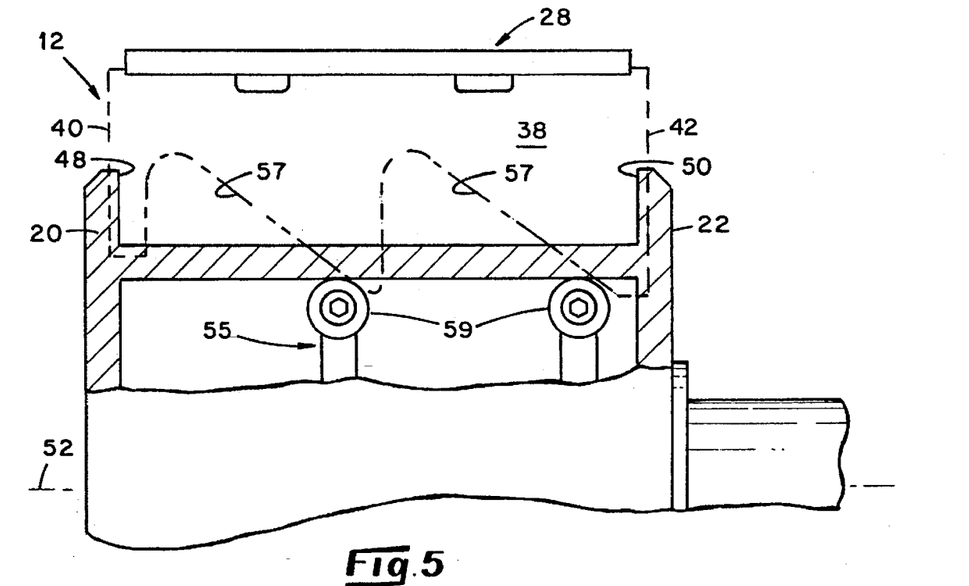
FIG. 5 is a fragmentary side view, shown partly in section, of the FIG. 2 drum illustrating schematically the means by which the circumference of the drum is adjusted.

In order to move the segments 28 radially toward and away from the longitudinal axis 52 of the drum 12 and thereby alter the drum circumference, the drum 12 includes adjustment means, generally indicated 55 in FIG. 5, which cooperate with the cam elements 38 so that upon adjustment, the cam elements 38 are slidably moved along the slots of the end plates 20 and 22 between alternative positions. Such adjustment means 55 are known in the art so that a detailed description of the adjustment means 55 is not believed to be necessary. Suffice it to say that each cam element 38 includes a contoured cam surface 57 and the adjustment means 55 includes roller cams 59 which are positioned in contact with the cam surfaces 57 of the cam elements 38. Each roller cam 59 is mounted for movement within the drum 12 along a linear path oriented parallel to the longitudinal axis 52 of the drum 12, and each cam element 38 is maintained in contact with the surface of a corresponding roller cam 59 under the influence of a spring (not shown). To effect an enlargement of the drum circumference, the roller cams 59 are forcibly moved against the corresponding cam element 38 (in a rightwardly direction as viewed in FIG. 5) so that the roller cams 59 roll along the corresponding cam surface 57 and so that the cam element 38 and the segment 28 supported thereby are moved radially outwardly of the drum 12 (and against the force of the spring) to an alternative position. To effect a reduction of the drum circumference, the roller cams 59 are withdrawn in a direction opposite the cam element 38 (in a leftwardly direction as viewed in FIG. 5) so that the cam element 38 (which is continuously maintained in contact with the corresponding roller cams 59) and the segment 28 supported thereby is permitted to move radially inwardly of the drum 12 (under the influence of the spring) to an alternative position.

Figure 7:
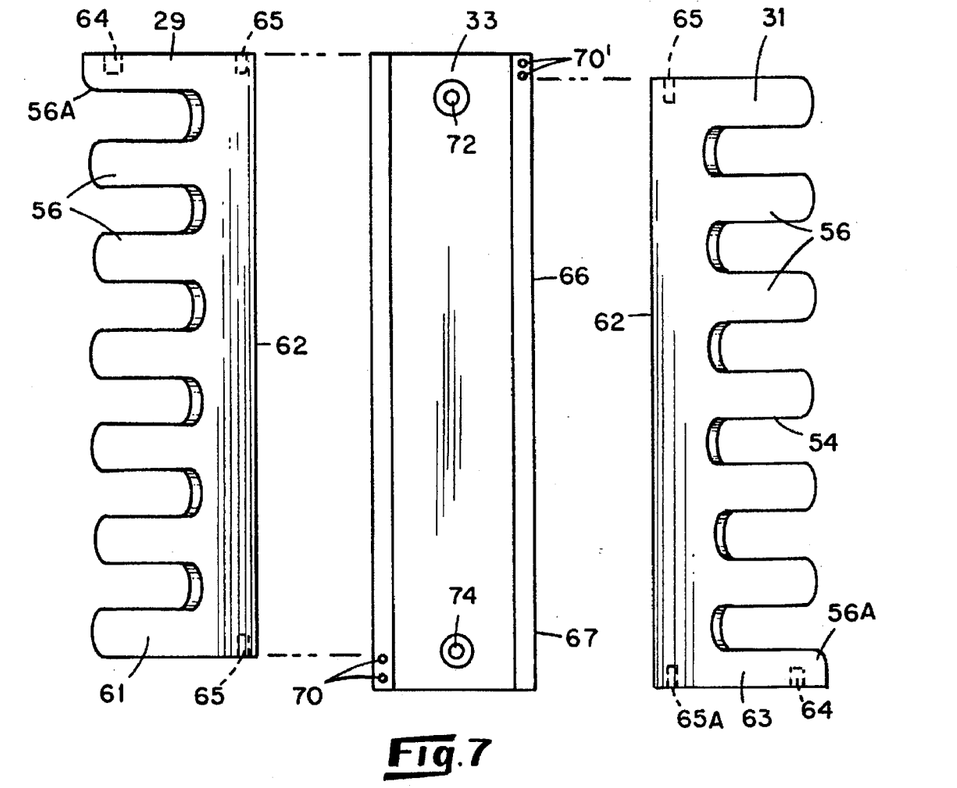
FIG. 7 is a plan view of the sections of the FIG. 6 segment.
Figure 8:
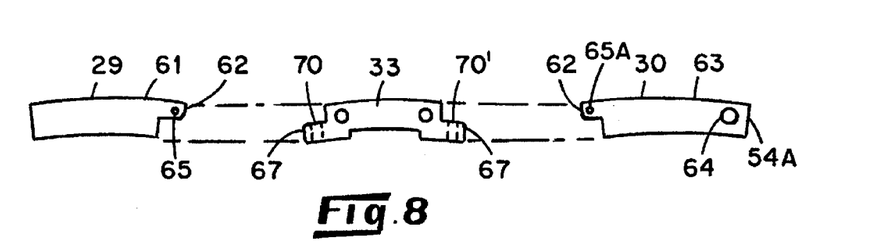
FIG. 8 is an end elevation view of the sections of the FIG. 6 segment.

With reference to FIGS. 7 and 8, each side section 29 or 31 extends along almost the entire length of the drum 12 and defines an outer arcuate surface 61 or 63. In addition, each side section 29 and 31 includes a stepped marginal edge opposite the fingers 56 having a lip 62. Along the end surface of the outermost finger, indicated 56A, of each side section 29 or 31, there is provided a bore 64 whose purpose will become apparent herein, and there is provided in each end of the lip 62 a bore 65 or 65A which is used to hingedly attach the side section 29 or 31 to the intermediate section 33 in a manner described herein.

Figure 9:
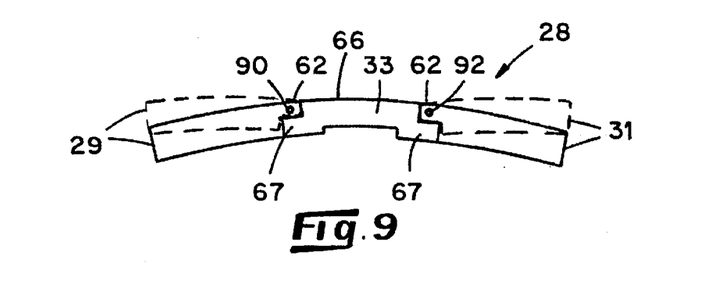
FIG. 9 is an end view of the sections illustrated in FIG. 8 but drawn to a slightly larger scale and shown in an assembled relationship.

With reference still to FIGS. 7, 8 and 9, the intermediate section 33 extends along substantially the entire length of the drum 12 and includes an outer arcuate surface 66. Furthermore, each intermediate section 33 includes a stepped marginal surface extending along the sides thereof and which includes a lip 67. As depicted in FIGS. 7–9, provided along one side of the lip 67 (i.e. the upper surface as shown in FIG. 8) are a pair of internally-threaded openings 70 and 70' used in the hinged attachment of the intermediate section 33 to a corresponding one of the side sections 29 and 31 in a manner described hereinafter. Defined in the outer surface 66 of the intermediate section 33 and adjacent the ends thereof are through-bores 72, 74 for accepting the bolts 34 and 36 (FIG. 3) with which the segment 28 is attached to a corresponding cam element 38, see FIGS. 2, 5, 11, and 12.

For hingedly securing one end of each side section 29 or 31 to the intermediate section 33 and with reference again to FIG. 6, there is provided a pair of stud members 76 and 76', each having a body 78 and a pin portion 80 projecting from the body 78. Each stud member, 76 for example, is secured to the intermediate section 33 with screws 82 which extend through the body 78 of the member 76 and are threadably received by the internally-threaded openings 70 and 70' (FIG. 7) of the intermediate member 33. Once the stud members 76 and 76' are secured to the intermediate section 33 with the screws 82, each side section 29 or 31 is arranged adjacent a corresponding marginal side edge of the intermediate section 33 so that the lip 62 of the side section 29 or 31 overlies the lip 67 of the corresponding marginal edge and so that the bores 65 and 65A provided in an end of each of side sections 29 or 31 pivotally accepts the pin portion 80 of a corresponding stud member 76 and 76'.

Figure 10:
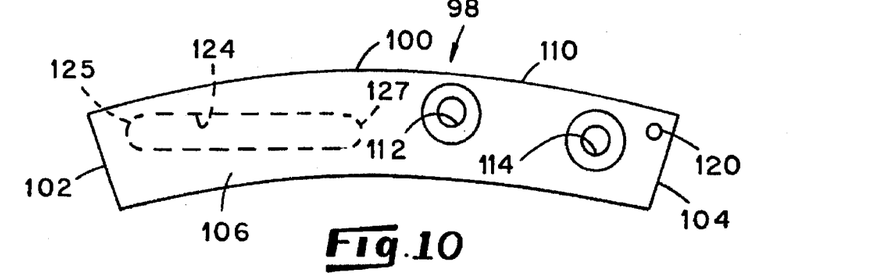
FIG. 10 is a side elevational view of a guide plate of the FIG. 6 segment.
Figure 11:
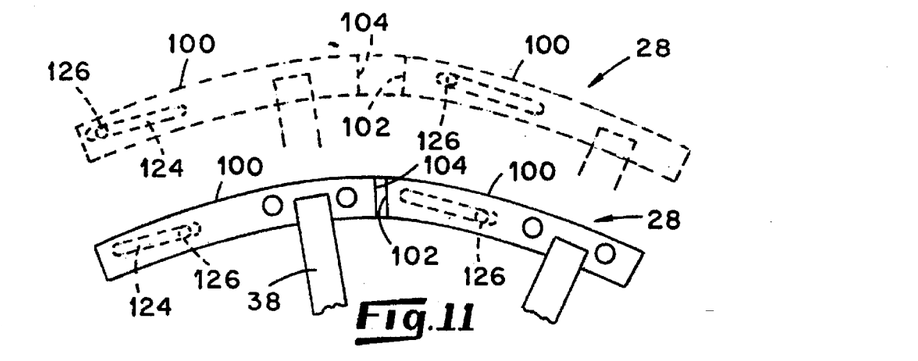
FIG. 11 is an end elevational view of a fragment of the FIG. 2 drum showing the relationship of adjacent segments and guide plates when the circumference of the drum is adjusted.

With reference to FIGS. 6, 10 and 11, each segment 28 also includes guide means 98 for coordinating the movement of the side sections 29 and 31 with those side sections of an adjacent segment 28 as the segments 28 are moved radially of the drum axis 52. The guide means 98 of the depicted embodiment includes a pair of elongated plates 100 each having two opposite ends 102 and 104 and two opposite side faces 106 and 108 extending between the ends 102 and 104. As best shown in FIG. 10, each guide plate 100 is arcuate in shape so that the curvature of its outer surface, indicated 110, corresponds with that of the outer surfaces 61, 63 and 66 of the segment sections 29, 31 and 33. Two through-openings 112 and 114 extend between the faces 106 and 108 for receiving the shanks of bolts 116, 118 (FIG. 6) used to attach the plate 100 to a corresponding end of the intermediate section 33.

Furthermore, a through-bore 120 extends between the faces 106, 108 at a location adjacent the plate end 104. One end of a pin 122 (FIG. 6) is fixed within the through-bore 120, and the other end of the pin 122 is loosely received by the bore 65A provided in the side face of the outermost finger 56A of the side section 29. It follows that with one end of each side section 29 or 31 being secured to the intermediate section 33 by way of a stud member 76 and the other end of each side section 29 or 31 being secured to the intermediate section 33 by way of the guide plate 100 and pin 122, each side section 29 or 31 is pivotally attached to the intermediate section 33 for hinged movement relative thereto about a pivot axis 90 or 92 between its position shown in solid lines in FIG. 9 and its position shown in phantom in FIG. 9. Accordingly, the diameter of each bore 65 or 65A is slightly larger than the diameter of the corresponding pin portion 80 or pin 122 accepted thereby. When each segment 28 is secured to its cam element 38 (FIG. 3) in its operative position about the drum 12, each axis 90 or 92 about which the side section 29 or 31 is permitted to pivot is substantially parallel to the drum axis 52.

With reference again to FIGS. 6 and 10, each guide plate 100 is also provided with an elongated slot 124 which is defined within each guide plate so as to extend substantially linearly along its side face 108. As best shown in FIG. 10, the end 125 of the slot 124 situated adjacent the plate end 102 is closer to the outer surface 110 of the plate 100 than is the opposite end 127 of the slot 124 thereby orienting the slot at an angle with respect to a radius of the apparatus. It is a feature of the guide plate 110 that as each segment 28 is moved radially toward or away from the drum axis 52, the side sections 29 and 31 of an adjacent segment 28 are pivotally moved relative to its corresponding intermediate section 33 by a corresponding amount. To this end and with reference again to FIGS. 6 and 11, one end of a pin 126 is fixedly received in the outermost finger 56A of each side section 29 or 31 adjacent the tip thereof, and the other end of the pin 126 is loosely received in the slot 124 of a guide plate 100 of an adjacent segment 28. Thus, as the intermediate section 33 of each segment 28 is moved radially toward or away from the drum axis 52, the pin 126 is guided along the slot 124. Alternately, the guide plate may be provided with a curved outer surface which is engaged by the pin of an adjacent side section in the nature of a cam and cam follower.

It follows from the foregoing that as the segments 28 are moved radially toward and away from the drum axis 52 between, for example, the position illustrated in solid lines in FIG. 11 and the position illustrated in phantom in FIG. 11, the guide plates 100 of adjacent segments 28 move closer together or further apart. As the plates 100 are moved relative to one another in this manner, each pin 126 (to which a side section 29 or 31 is secured) slidably moves along its corresponding slot 124 from one end 125 of the slot 124 to the opposite end 127 of the slot 126.

Furthermore, since the slot 124 is oriented as aforedescribed (so that one of its ends is situated closer to the outer surface 110 than is the other end), the side section 29 or 31 of the adjacent segment 38 is hingedly moved relative to its intermediate section 33 about the pivot axis 90 or 92 as the intermediate section 33 is moved toward and away from the drum axis 52. In other words, as the intermediate section 33 of one segment 28 is moved radially outwardly of the drum axis 52, the side sections 29 and 31 of the one segment 28 are hingedly moved by the guide plates 100 of an adjacent segment 28 relative to the intermediate section 33 from, for example, the solid line position shown in FIG. 9 toward the position shown in phantom in FIG. 9. Conversely, as the intermediate section 33 of one segment 28 is moved radially toward the drum axis 52, the side sections 29 and 31 of the one segment 28 are hingedly moved by the guide plates 100 of an adjacent segment 28 relative to the intermediate section 33 from, for example, the FIG. 9 phantom-line position toward the FIG. 9 solid-line position.

Figure 12:
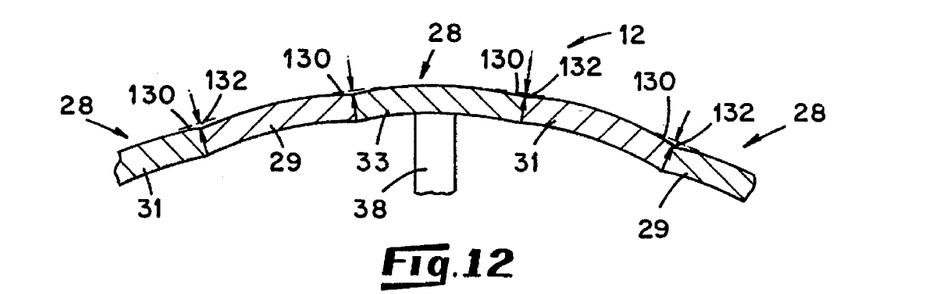
FIG. 12 is a radial cross sectional view of a fragment of the FIG. 2 drum.

The advantage provided by the aforedescribed multi-sectioned segments 28 and the guide plates 100 can be readily appreciated when comparing the circumferential surface of the drum 12 to that of a drum of the prior art having segments comprised of only a single section. For example, there is illustrated in FIG. 12 a cross-sectional view of a portion of the drum 12 with its multi-sectioned segments 28 which collectively define a segment of the arc of the drum circumference, e.g. an arc whose segment spans an angle of thirty-six degrees about the drum axis 52. It can be seen in FIG. 12 that there exists transitional regions 130 between the outwardmost portions of the arcuate surfaces provided by the sections 29, 31 and 33 and the sections 29 and 31 of an adjacent segment 28 at which the surface of the drum 12 is relatively flat. For a purpose which will be apparent herein, the distance that each of these flat regions or "spots" 130 are spaced from the outermost drum circumference (i.e. the effective circumference of the drum for tire-building purposes) is indicated 132.

Figure 13:
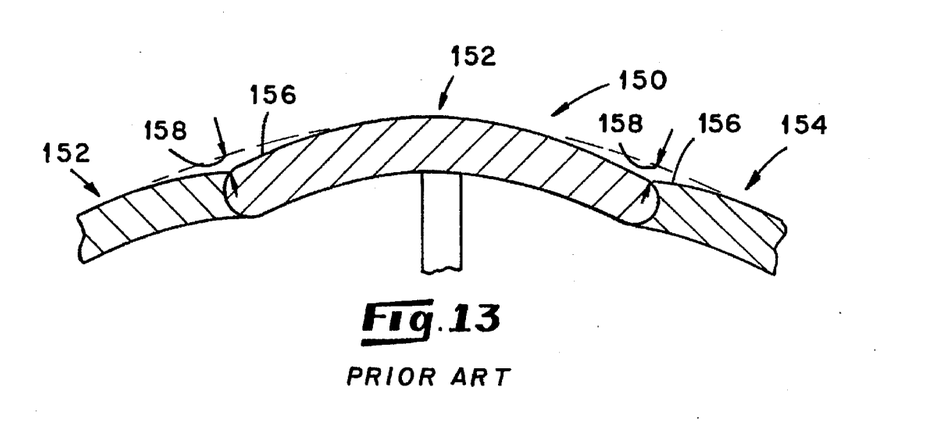
FIG. 13 is a view similar to that of FIG. 12 of a fragment of a belt and tread drum of the prior art.

By comparison, there is illustrated in FIG. 13 a portion of a drum 150 of the prior art having an arcuate segment 152 wherein each segment 152 is comprised of a single section 154 whose arcuate surface generally spans about the same arc (e.g. an arc whose segment spans thirty-six degrees about the longitudinal axis of the drum) as does that of each segment 28 of the FIG. 12 drum. It can be seen in FIG. 13 that the circumferential surface of the drum 150 is provided with relatively flat regions, or "spots" 156, of transition between the outermost portions of the surfaces of adjacent segments 152. It can also be seen that the distance, indicated 158, at which each flat spot 156 is spaced from its outermost drum circumference is considerably greater than the distance 132 at which each dip 130 (FIG. 12) is spaced from its outermost drum circumference. Because the flat spots 156 of the FIG. 13 drum are appreciably deeper than those of the FIG. 12 drum, and that the magnitude of this depth is responsible for a large radial runout when a tire is constructed on the FIG. 13 drum at its larger diameter settings, the FIG. 12 drum is preferred over the FIG. 13 drum. Thus, a tire constructed about the FIG. 12 drum is less likely to be adversely affected by its flat spots and out-of-round condition than is a tire constructed about the FIG. 13 drum, and the FIG. 12 drum is advantageous in this respect.

Thus, for example, by modifying a drum having ten single-sectioned segments supported about its longitudinal axis so that each of its segments includes three hinged sections, i.e. two sides and an intermediate section, the modified drum is provided with a total of thirty surface-defining sections, rather than ten segments, which collectively cooperate to reduce the out-of-round condition of the drum especially at the larger diameter settings. Such a thirty-section drum (comparable in construction with that of the drum 12 of FIGS. 1–12) has been built and tested for radial runout. This drum has a circumferential working range of about 60.0 inches to 83.50 inches with an optimum circumference of about 60.0 inches. Measurements of radial runout of tires constructed with the thirty-section drum at a working radius of about 82.20 inches (at which the out-of-roundness of the drum would be at its greatest) showed only a 0.040 inch to 0.050 inch variation per segment whereas measurements of runout of tires constructed with a comparable drum whose segments were each comprised of a single section and at a working radius of about 80.90 inches (at which the out-of-roundness of the drum would be at about its greatest) showed a 0.070 inch to 0.100 inch variation per segment.

The foregoing detailed description of the drum 12 is for the purpose of illustration and not limitation. It should be recognized that a belt and tread drum embodying features of the present invention could be made with numerous modifications, substitutions, deletions and additions without departing from the scope of the claims as set forth hereinafter.

For example, whereas there is described herein a "three-sectioned" segment that provides thirty sections which define the outer circumference of the drum, it is to be recognized that in accordance with one aspect of the present invention, each segment may comprise only two sections which are hingedly connected as by a hinge rod about a common hinge line.

Figure 17:
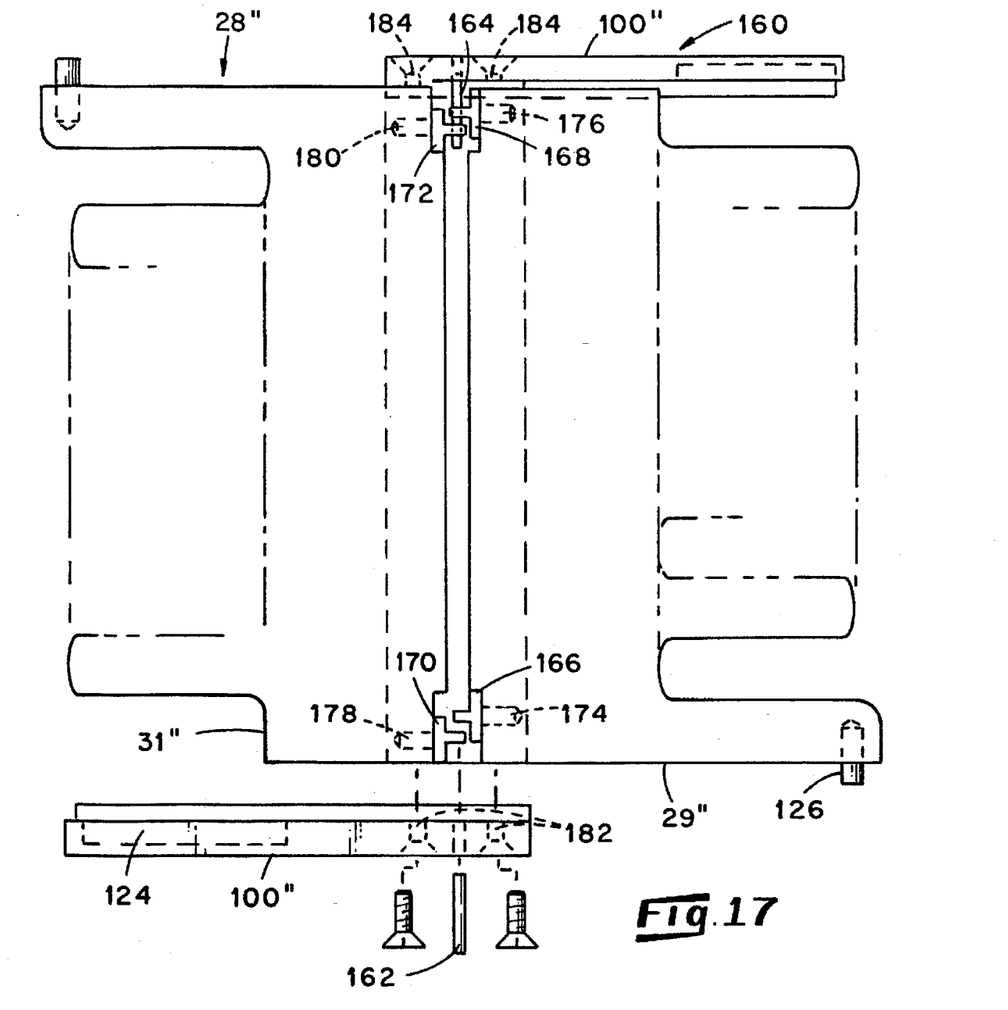
FIG. 17 is a top plan view depicting an alternative embodiment of a multi-sectional segment embodying various features of the invention.
Figure 18:
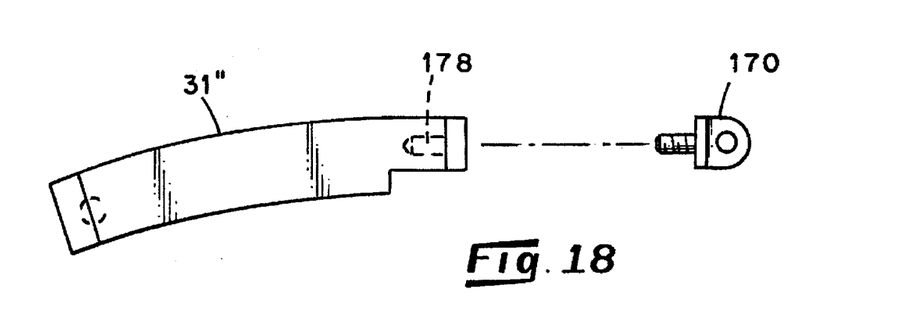
FIG. 18 is an end view of the left hand side section of the segment depicted in FIG. 17.

With reference to FIGS. 17 and 18, there is depicted such an alternative embodiment of the multi-sectional segment 28 of the present invention wherein the intermediate section of the alternative segment 28" has substituted therefor a pair of hinge pins 162 and 164 that are fixedly mounted in respective ones of the guide plates 100". These pins project from their respective guide plates inwardly of the segment 28" to pivotally receive thereon pin mounts 166, 168, 170 and 172 which are threaded into respective bores 174, 176, 178 and 180 provided in the side edge of first and second side sections 29" and 31". These side sections are essentially otherwise identical to the side sections 29 and 31 described hereinabove. In this alternative embodiment, as noted, the side sections are hingedly supported by the guide plates. In turn, these guide plates are mounted directly to a respective underlying supporting cam (not shown in FIG. 17). Further, the interconnection of the side-sections 29" and 31" of this alternative embodiment with the side sections of adjacent segments is also essentially identical to the interconnection heretofore described and shown in the FIG. 6–13.

Figure 14:
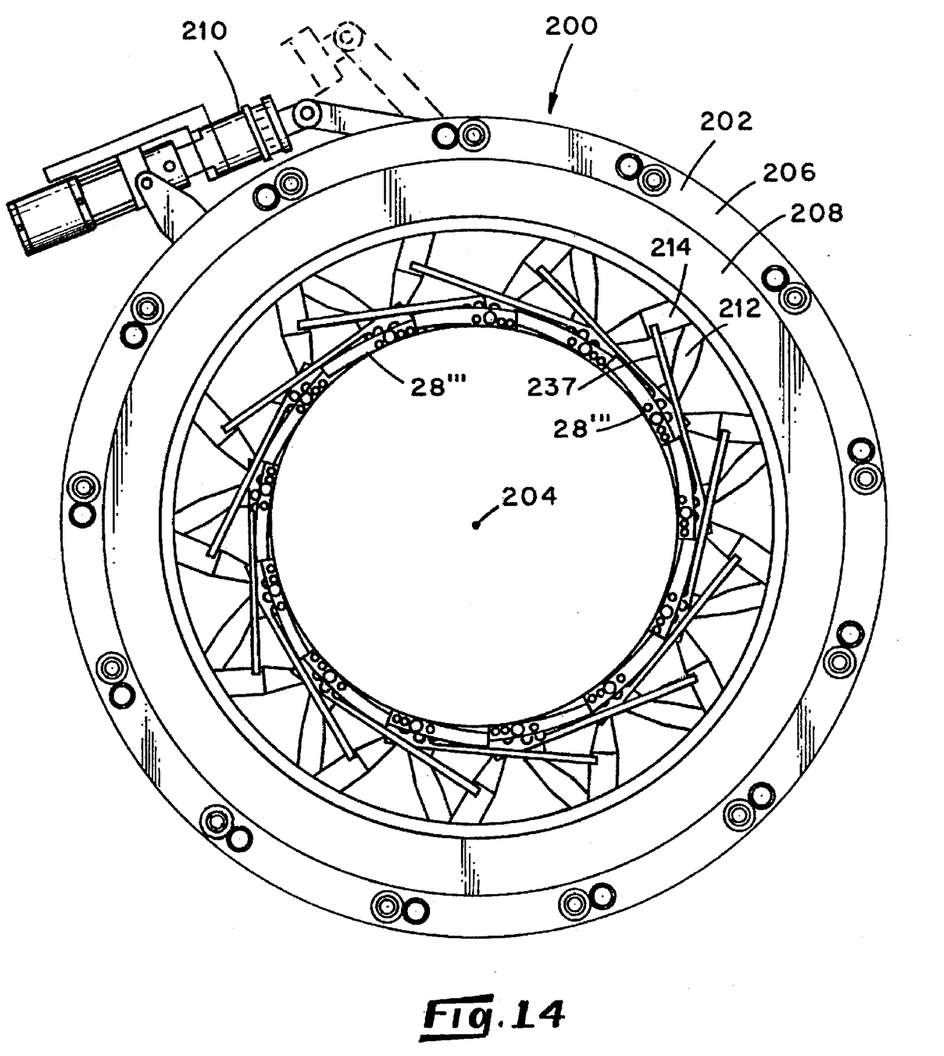
FIG. 14 is a side elevation view of a transfer ring embodying various of the feature of the present invention, and shows contracted to a maximum inner diameter.
Figure 15:
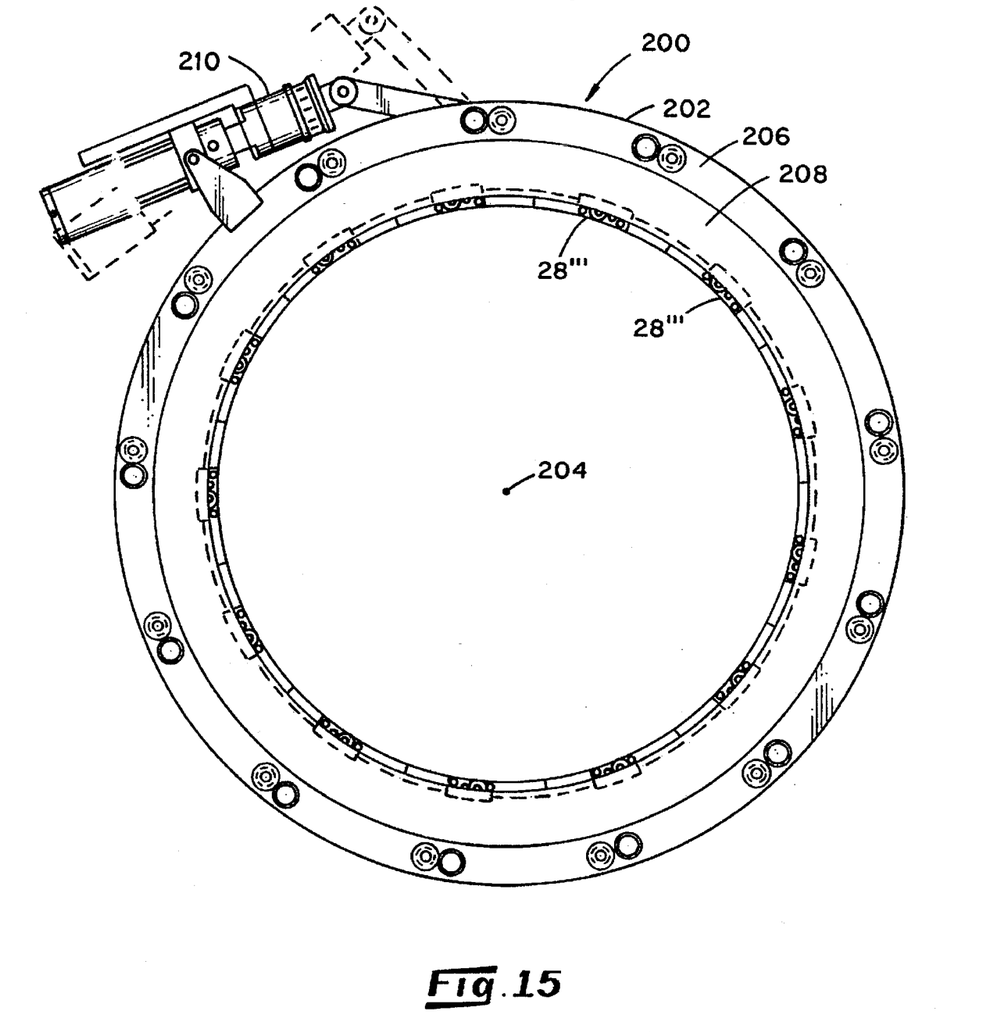
FIG. 15 is a side elevation view of the transfer ring of FIG. 14 and shown expanded to a maximum inner diameter.
Figure 16:
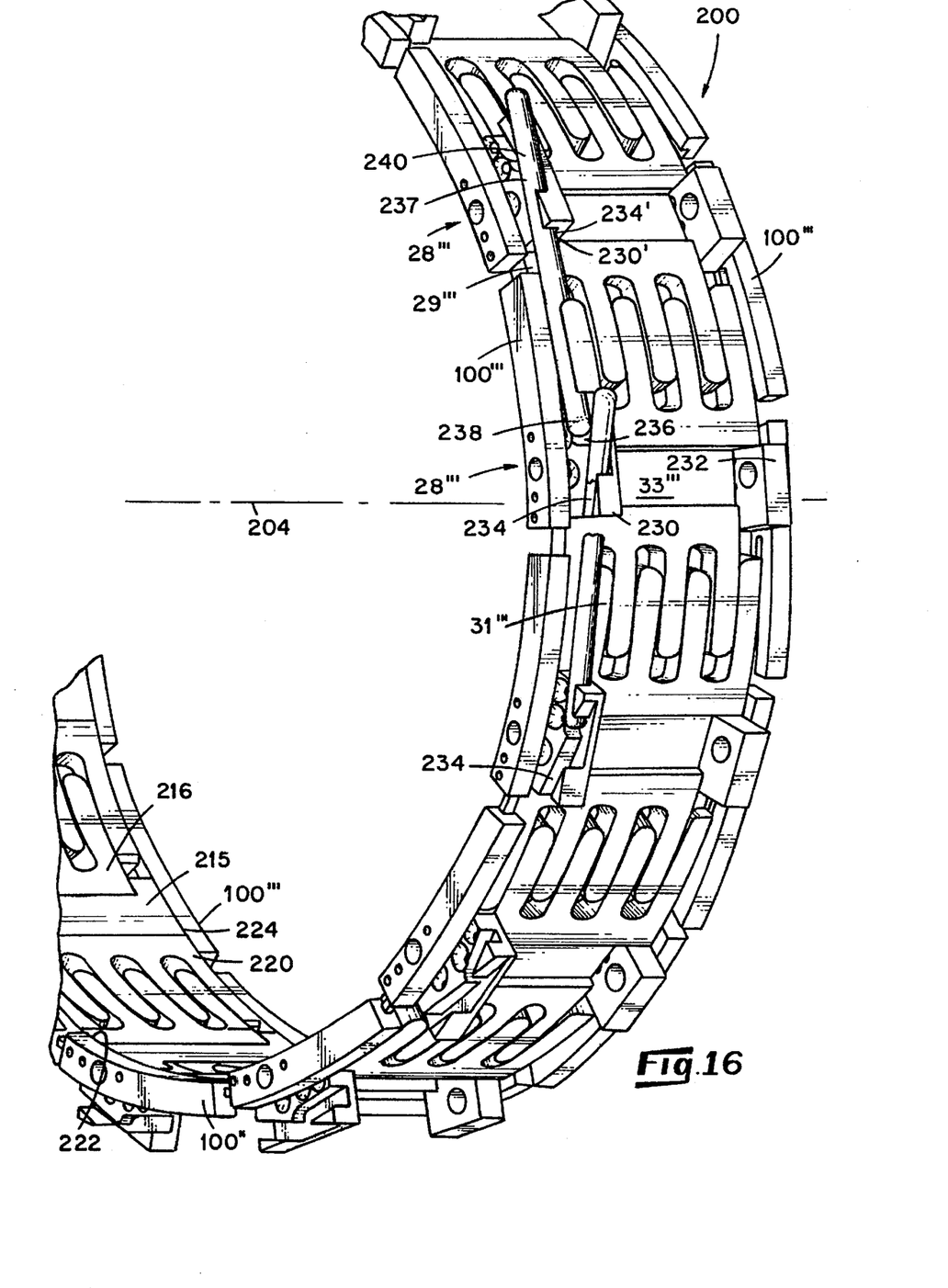
FIG. 16 is a partial view, in perspective, of the multi-sectional segment units of a transfer ring shown expanded to about 30 percent of its maximum inner diameter.

With reference to FIGS. 14–16, one embodiment of the present invention may take the form of a transfer ring 200 that includes a circular frame 202 having a central axis 204. This frame is made up of an outer ring 206 of "U"-shaped cross section and an inner ring 208 with the inner ring being rotatable within the outer ring. Rotation of the rings relative to one another is provided by piston-cylinder means 210. The frame serves as the mounting for a plurality of multi-sectional segments 28''' that are movable radially inwardly and outwardly relative to the central axis. Mounting of the segments for radial movement is by means of a plurality of lever arms 212, 214 that are connected at one of their respective ends to the intermediate section 33''' of a multi-sectional segment 28''' and at their opposite respective ends to the inner ring of the frame. Through rotation of the inner ring relative to the outer ring of the frame, the segments are caused to move radially inwardly or outwardly from the central axis of the frame.

With specific reference to FIG. 16, there is depicted a plurality of multi-sectional segments 28''' which are substantially identical to the multi-sectional segments 28 described hereinabove, but with the obvious difference that the segments 28''' are designed with respective concave arcuate surfaces 216, 215, 220 that collectively define an inner circumference of the transfer ring, as opposed to the convex arcuate surfaces of the segments 28 that go to make up a belt and tread drum, for example. Each segment 28''' includes an intermediate section 33''' and two flanking side sections 29''' and 31'''. Each intermediate section of segment includes a guide plate 100''' fixedly attached to one of its ends 222 and a further guide plate 100''' fixedly attached to the other of its ends 224. These guide plates serve to interconnect the side sections 29''' and 31''' of adjacent segments to the intermediate section 33''' of the first segment 28'''. As also described hereinabove, each of the side sections 29''' and 31''' of a segment 28''' is hingedly mounted to their respective intermediate section 33'''. This hinged mounting of the side sections to their respective intermediate section and the interconnection of adjacent side sections of adjacent segments serves to hingedly rotate the side sections about their respective hinge mounted axis as the several segments are moved radially inwardly or outwardly with respect to the central axis.

Mounting blocks 230 and 232 secured to the opposite ends of each intermediate section 33''' serve to receive the connecting ends of the lever arms 212 and 214 for mounting the segment to the frame 202 for radial movement of the several segments inwardly and outwardly relative to the central axis 204. Each mounting block includes first and second guide grooves 234 and 236 respectively. A rigid guide rod 237 having one end 238 thereof anchored in a first guide groove 236 extends therefrom such that its opposite end 240 is slideably received in the second groove 234' of the guide block 230' of an adjacent segment. As the segments move radially inwardly or outwardly, the end 240 of the guide rod slides within its respective groove 234 thereby maintaining constant relative rotational positioning of the several segments 28'''.

The embodiment depicted in FIGS. 14–16 is particularly useful as a transfer ring for grasping a completed belt and tread package after its completion and release from a belt and tread drum by engaging the outer circumference of the package with the inner arcuate surfaces of the segments of the transfer ring. As is recognized in the vehicle tire industry, this engagement of the "shoes" (i.e segments) of the transfer ring and the outer circumferential surface of the belt and tread package must be effected very carefully to avoid developing indentations in the package by the shoes. Such indentations commonly later show up as imperfections in the finished vehicle tire.

What is claimed:

1. Apparatus defining an outer circumference or an inner circumference to serve as a forming surface or as a circumference-engaging surface, respectively, comprising frame means having a central axis, a plurality of multi-sectional segments mounted by said frame means in side-by-side relationship about said central axis thereof, said segments being radially movable inwardly and outwardly with respect to the central axis of said frame means and including arcuate surfaces which move toward one another when said segments are moved radially inwardly and away from one another when said segments are moved radially outwardly to collectively define a circumference, each segment including an intermediate section and circumferentially adjacent first and second side sections flanking the intermediate section on respective ones of the opposite sides thereof, means pivotally mounting each of the first and second side sections to a respective side of the intermediate section for hinged movement of each side section with respect to the intermediate section, guide means secured to each of the opposite ends of the intermediate section of a first segment, the guide means on one end of the intermediate section extending therefrom in the direction of a side section of a further segment adjacent to the first segment, and the guide means on the opposite end of the intermediate section extending therefrom in the direction of a side section of a still further segment adjacent to the opposite side of the intermediate section, means interconnecting each of said guide means to their respective side section of said further and said still further segments whereby radial movement of the intermediate section of the first segment is converted into hinged movement of the side sections of said further and said still further segments.

2. The apparatus of claim 1 wherein said means interconnecting each of said guide means to their respective side sections of said further segment and said still further segment includes pin means associated with said respective side sections, and each of said guide means includes a curved surface thereon, said pin means slidably engaging said curved surface of a respective guide means, said curved surface being of a selected curvature which causes said side sections to pivot about their respective hinged mountings as said segments move toward or away from one another during radial movement thereof.

3. The apparatus of claim 1 wherein said means interconnecting each of said guide means to their respective side sections of said further segment and said still further segment includes pin means associated with said respective side sections and slot means extending along a portion of said guide means and slidably receiving said pin means therein, said slot means having a longitudinal axis, said longitudinal axis being oriented at an angle with respect to a radius of said frame means such that movement of said segments toward or away from each other during inward or outward radial movement thereof results in corresponding hinged movement of the side sections of said further segment and said still further segment.

4. In a transfer ring or drum apparatus for use in the manufacture of a vehicle tire wherein the apparatus has a longitudinal axis and a plurality of arcuate segments which each define an arc of an inner or outer cylindrical surface of the apparatus so that the segments collectively define the cylindrical surface and wherein the segments are supported for movement radially of the longitudinal axis to accommodate an adjustment in the circumference of the cylindrical surface, the improvement characterized in that:

each arcuate segment comprises two side sections associated with an intermediate section and being radially moveable therewith wherein each section defines a portion of the arc of the cylindrical surface and wherein the side sections are hingedly movable relative to the intermediate section about an axis of pivot oriented substantially parallel to the longitudinal axis of the apparatus; and guide means associated with each arcuate segment for coordinating the movement of the segment with the movement of a section of a circumferentially adjacent arcuate segment so that the movement of each arcuate segment radially of the longitudinal axis during an adjustment of the circumference of the outer cylindrical surface effects a hinged movement of a section of the adjacent arcuate segment about its axis of pivot.

5. The apparatus as defined in claim 4 wherein one of the guide means and one section of each arcuate segment includes means defining a slot and the other of the guide means and the one section of each adjacent arcuate segment includes means providing a pin, and the pin is slidably received by the slot so that as the segments are moved radially of the longitudinal axis of the apparatus, the movement of the one section of the adjacent arcuate segment is coordinated with that of the guide means as the movement of the pin is guided along the slot.

6. The apparatus as defined in claim 5 wherein the one section of the adjacent arcuate segment includes means defining a pin, and the guide means includes a plate affixed to a section of an adjacent arcuate segment, and the plate defines an elongated slot therein within which the pin is slidably received.

7. The apparatus as defined in claim 4 wherein at least one of the two side sections of each arcuate segment is provided with a row of spaced fingers which are arranged in such a relationship with the fingers of a finger-providing section of an adjacent arcuate segment so that as the circumference of the cylindrical surface is adjusted and the side sections of each segment are hingedly moved relative to the intermediate section about a corresponding axis of pivot, the fingers of the finger-providing sections move into and out of the spacings provided between the fingers of the finger-providing section of an adjacent arcuate segment, and the guide means coordinates the hinged movement of the finger-providing sections of the adjacent segments as the circumference of the cylindrical surface is adjusted as aforesaid.

8. The apparatus as defined in claim 7 wherein each of the two side sections is provided with fingers wherein the fingers of the two side sections generally extend in opposite directions, and wherein the guide means includes a plate fixedly secured to the intermediate section for movement therewith as the segment is moved radially of the longitudinal axis of the apparatus and the plate is connected to a finger-providing section of an adjacent segment so that as the segment is moved radially of the longitudinal axis as aforesaid, the plate of the guide means and the finger-providing side section to which the plate is connected cooperate as cam and cam follower so that movement of the plate radially of the longitudinal axis effects a hinged movement of the finger-providing section of the adjacent segment to which the plate is connected, this hinged movement being relative to the intermediate section of the adjacent segment.

9. The apparatus as defined in claim 8 wherein the plate of the guide means is a first plate, the guide means includes a second plate, and the first and second plates are fixedly secured at opposite ends of the intermediate member of one segment and are connected to the finger-providing side sections of the two adjacent segments disposed on opposite sides of the one segment so that the radial movement of the one segment relative to the longitudinal axis effects a hinged movement of each of the finger-providing side sections to which the first and second plates are connected.

10. In a drum apparatus or a transfer ring apparatus for use in the forming or conveyance, respectively, of a cylindrical component of a vehicle tire wherein the drum or transfer ring apparatus has a longitudinal axis and an adjustable outer cylindrical circumference about the longitudinal axis and includes a plurality of arcuate segments which collectively define the cylindrical surface of the apparatus and which are supported for movement radially of the longitudinal axis to adjust the circumference of the cylindrical surface, and wherein each arcuate segment includes means providing a row of spaced fingers arranged in such a relationship with the fingers of the finger-providing means of an adjacent arcuate segment of like construction so that as the circumference of the cylindrical surface is increased and decreased as the arcuate segments are moved radially of the longitudinal axis, the fingers of the one segment move into and out of the spacings provided between the fingers of the adjacent arcuate segment, the improvement comprising:

guide means associated with one arcuate segment and connected to the finger-providing means of the adjacent segment for coordinating the movement of the finger-providing means of the adjacent arcuate segment with the movement of the one arcuate segment radially of the longitudinal axis, said guide means including means slidably connecting the one arcuate segment with the finger-providing means of the adjacent arcuate segment so that as the arcuate segments are moved radially of the longitudinal axis to adjust the circumference of the outer cylindrical surface, the one arcuate segment and the finger-providing means of the adjacent segment act as cam and cam follower as the finger-providing means moves in response to the movement of the one arcuate segment radially of the longitudinal axis.

11. The improvement as defined in claim 10 wherein said guide means is fixedly secured to the one arcuate segment and includes means defining a slot, and the adjacent arcuate segment includes a pin which is received by said slot so that as the one arcuate segment is moved radially of the longitudinal axis, movement of the finger-providing means of the one arcuate segment is effected as the pin is guided along the slot.

12. The improvement as defined in claim 10 wherein each arcuate segment is disposed adjacent another arcuate segment along the circumference of the apparatus, and guide means are associated with each arcuate segment so that as each arcuate segment is moved radially of the longitudinal axis of the apparatus, the movement of the finger-providing means of each arcuate segment is guided by the movement of its adjacent segment.

* * * * *